United States Patent

[11] 3,550,635

[72] Inventor John B. Schroer
 815 Kenny Way, Las Vegas, Nev. 89107
[21] Appl. No. 725,348
[22] Filed Apr. 30, 1968
[45] Patented Dec. 29, 1970

[54] CAP ASSEMBLY
 4 Claims, 4 Drawing Figs.
[52] U.S. Cl. .................................................. 138/89,
  215/54, 220/24.5
[51] Int. Cl. ................................................. F16l 57/00
[50] Field of Search ........................................ 85/53, 55,
  63, 70—72, 75, 79; 138/89, 96; 215/52(Cursory),
  54; 220/24.5; 292/(Consulted)

[56] References Cited
UNITED STATES PATENTS

| | | | |
|---|---|---|---|
| 912,823 | 2/1909 | Dehn | 138/89(UX) |
| 1,837,346 | 12/1931 | Thomas et al. | 138/89(UX) |
| 2,269,198 | 1/1942 | Hicks | 138/96 |
| 2,810,401 | 10/1957 | Stansbury | 220/24.5(UX) |
| 3,175,727 | 3/1965 | Piel | 220/24.5 |

FOREIGN PATENTS

| | | | |
|---|---|---|---|
| 148,398 | 2/1904 | Germany | 220/24.5 |
| 19,835 | 6/1901 | Great Britain | 215/54 |

Primary Examiner—Laverne D. Geiger
Assistant Examiner—Edward J. Earls
Attorney—A. Yates Dowell and A. Yates Dowell, Jr.

ABSTRACT: An assembly for mounting a cap on the end of a tubular member includes an anchor member having a central bowed section extending generally transversely of the tube, foot members extending generally parallel to the tube axis from each end of the bowed section toward the cap, a bolt connecting the cap and the anchor member for biasing the ends of the bowed section outwardly into engagement with the wall of the tube, flanges on the bowed section for holding a nut threaded on the bolt against rotation, and a flat washer positioned between the anchor and the cap.

PATENTED DEC 29 1970
3,550,635
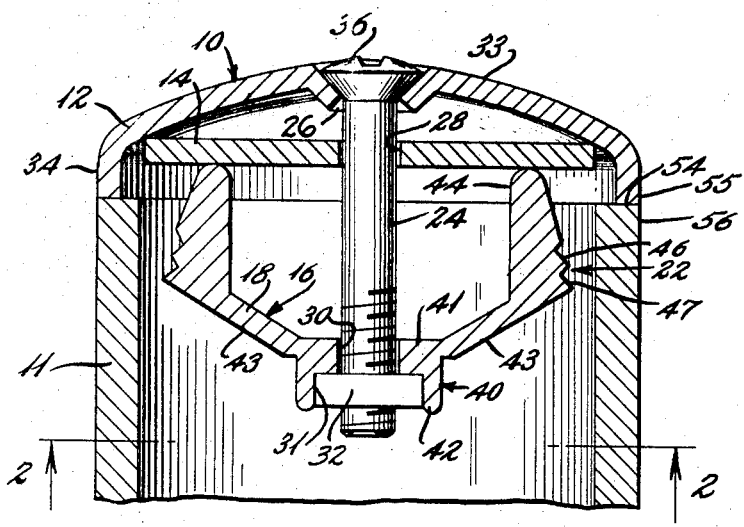
Fig. 1
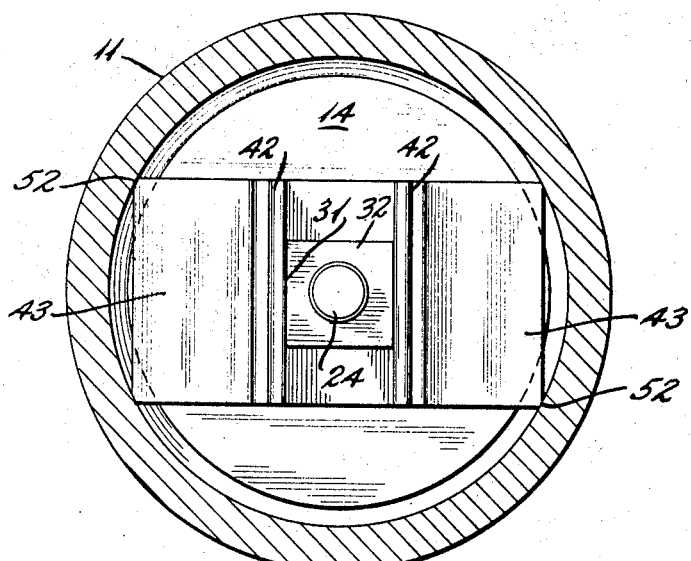
Fig. 2
Fig. 3
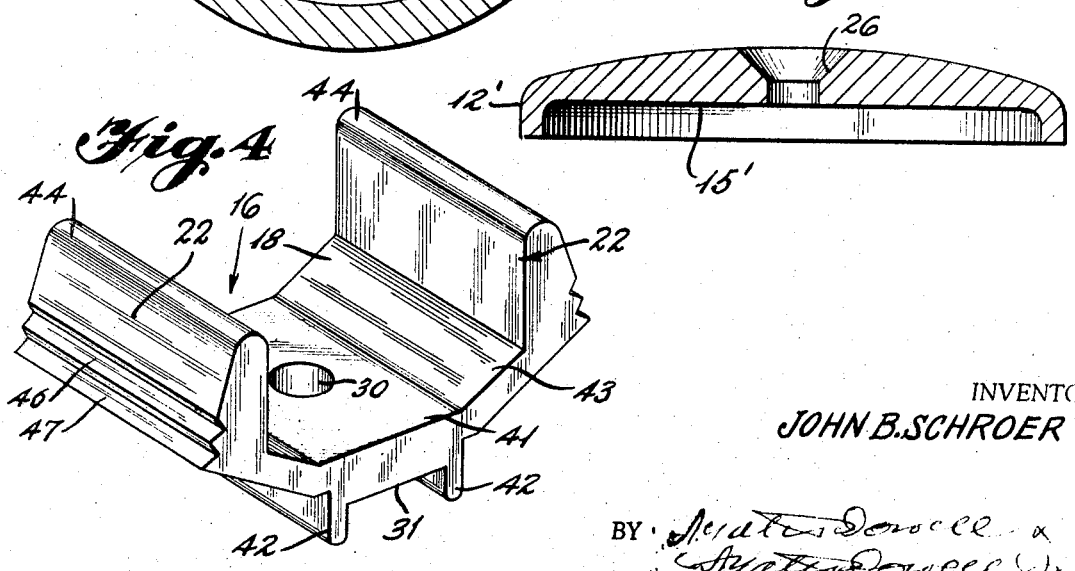
Fig. 4
INVENTOR
JOHN B. SCHROER
BY
ATTORNEYS

CAP ASSEMBLY

BACKGROUND OF THE INVENTION

1. Field of the Invention

This invention relates generally to connector elements for tubular structures and more particularly to a device for attaching members to the ends of tubular structures. While the invention is particularly intended for the attachment of an ornamental and protective cap to the ends of tubes used in hand rails and fences, it may lend itself to other uses for tubular structures such as in forming scaffolding and table legs with tubes.

2. Description of the Prior Art

Hand rails, fences, etc. are frequently made of tubular rail and post sections which are cut to size and joined at the site of the installation. The exposed ends of such posts and rails are normally covered with caps to improve their appearance, to keep out moisture, and to prevent sharp ends of the tubes from causing injury.

Connecting such caps to the tube ends has often required the use of expensive techniques, such as welding, which may require special equipment or skills, or the use of specially machined connector parts. For example, interengaging threads might be cut in both the caps and the tubes. Machining such threads is expensive. In addition, both cap and pipe must be made in an appropriate shape to provide space for the cutting of threads. This may require excessive material and may make difficult the use of simple manufacturing processes such as stamping for forming the caps or extrusion for forming the pipes. This also makes it more difficult to cut the tubes to size to fit a particular installation since the threads on the tube would have to be cut at the installation site.

Connectors have been provided which can be used on the ends of a plain tube, but these have been expensive to manufacture since the parts must be machined to close tolerances so that cap and tube will be aligned when connected. In addition, the tube itself must be made to close tolerances, since alignment of cap and tube may be difficult if the tube's inner surface is not precisely positioned relative to its outer surface.

Alignment of cap and tube is also difficult when polygonal or other noncircular tubes or caps are used. It is desirable to provide a connector which facilitates alignment of either circular or noncircular tubes and caps.

It has often been difficult to construct prior art connecting structures from a material matching that of the tubes and caps. Use of the same material minimizes corrosion problems and has an intangible advantage in emphasizing to the purchaser that the tubes and connectors are part of a common set. In recent years, some tubes and caps have been made of such materials as aluminum and plastics. It is desirable to provide a connector element which may be fabricated from such materials by such processes as stamping, extrusion, and injection molding, or which may be fabricated by earlier known processes or with earlier known materials.

Prior art connectors for joining tubular structures often required considerable manual dexterity to assemble parts concealed within the tubes and were often complex in structure. Assembly often involved the risk that a part might be lost by dropping it into an inaccessible section of the tube.

SUMMARY OF THE INVENTION

Briefly stated the present invention includes an anchor member which is used to connect an end member such as an ornamental cap to a tube. The anchor member includes a bowed central section extending transversely across a tube, an opening for a threaded bolt connected to the end member, flanges for engaging the sides of a nut connected to the bolt and legs connected to the ends of the curved section and engaging the end member. Tightening of the bolt flattens the central section and forces its ends outwardly into engagement with the inside of the tube.

OBJECTS OF THE INVENTION

Among the objects of the present invention is the provision of a connector element for joining a cap to a tube and which permits easy alignment of the cap relative to the tube prior to tightening.

A further object of the invention is to provide such a connector assembly which is simple and inexpensive to manufacture and requires no close tolerances either in its own manufacture, or in the manufacture of the caps and the tubes with which it is used, and which may be easily connected to a tube by unskilled or inexperienced persons.

A further object is the provision of such a connector element which may be made from aluminum by an extrusion process.

A still further object is the provision of such a connector element which in use will be largely concealed within the tube to improve the ornamental appearance and minimize the danger caused by projecting parts.

A still further object is the provision of such a connector element which may be used for joining various types of end members other than ornamental caps to tubular members.

Other object and advantages of the invention will be apparent from the following description considered in conjunction with the accompanying drawing.

BRIEF DESCRIPTION OF THE DRAWING

FIG. 1 is a sectional view on the line 1–1 of FIG. 2;
FIG. 2, a sectional view on the line 2–2 of FIG. 1;
FIG. 3, a cross-sectional view similar to FIG. 1 of a cap according to a different embodiment of the invention; and
FIG. 4, a perspective of the anchor member.

DESCRIPTION OF ONE EMBODIMENT

With reference to the drawing, a cap assembly 10 is provided for attachment to the end of a tube 11. According to the present invention, the cap assembly 10 includes a cap 12 to which a flat washer 14 and an anchor member 16 are adjustably connected. The anchor member 16 is of generally channel shape and includes a bowed section 18 having substantially parallel foot members 22 at opposite sides thereof. A threaded bolt 24 passes through generally centrally aligned openings 26, 28 and 30 in cap 12, washer 14 and anchor member 16, respectively, and is threaded within a nut 32 received within a channel 31 on the convex face of curved section 18.

Cap 12 is formed in any desired manner, as by stamping and includes a central spherically curved dish portion 33 terminating in a generally cylindrical rim 34 of the same outer diameter as tube 11. Central opening 26 in the cap preferably is countersunk for the head 36 of bolt 24.

Washer 14 fits within the cap 12 and provides a flat surface against which the foot members 22 of anchor member 16 can bear. Its central opening 28 is slightly larger than the outside diameter of bolt 24.

Anchor member 16 is formed from any desired material such as aluminum. It includes a central section 40 formed of a relatively thick base 41 having a pair of spaced flanges 42 projecting therefrom defining channel 31 which is slightly wider than nut 32. Wing sections 43 project at an angle from each side of base 41 and form with it bowed section 18 of anchor member 16. Wing sections 43 are approximately one-half the thickness of base 41. Foot members 22 extend from the ends of wing sections 43 in a direction opposite flanges 42. The foot members are tapered and are thicker adjacent the wing section than at their outer ends 44. Ends 44 are rounded. Foot members 22, even at their outer ends, are substantially thicker than wing sections 43 so they will not buckle when bolt 24 is tightened. Instead bending takes place in the relatively thin wing sections. The outer surface of each foot member 22 has a pair of serrated grooves 46, 47 formed therein adjacent their juncture with the outer end of wing section 43.

As illustrated in FIG. 2, the distance between foot members 22, as well as the length of such members, is determined by the inner periphery of the tube 11. In other words, a tube having a slightly larger inner periphery could use an anchor member 16 similar to that shown in FIG. 2 except that the foot member 22 would be of greater length so that the outer edges of such foot members would engage the inner periphery of the tube when the bowed portion 18 is expanded. Conversely, a tube having a slightly smaller inner periphery could use an anchor member similar to that illustrated with the exception that the length of the foot members would be shorter. Tubes having substantially different inner peripheries would require a greater or lesser spacing between the foot members 22.

OPERATION

In use anchor member 16 is loosely secured within the concave portion of cap 12 with washer 14 interposed therebetween. Nut 32 is threaded onto the bolt and the bolt is tightened enough to draw the nut loosely into channel 20 but not tightly enough to bend wing sections 43. The nut is maintained sufficiently loose so that the legs 22 may slide on the flat surface 15 of the washer.

The cap and anchor member as thus assembled are applied to the tube 11. The position of cap 12 is adjusted so that rim 34 is in engagement with the end 54 of the tube 11 and with the outer surface 55 of cap rim 34 aligned with the outer surface 56 of tube 11. The loose positioning of nut 32 permits the foot members 22 of the anchor member to slide upon washer 14. Bolt 24 is then tightened by turning its head 36 with a screwdriver or the like. Rotation of the bolt 24 draws the base 41 toward the cap 12 and moves foot members 22 outwardly by bending wing sections 43. Portions of the outer corners 52 of the foot members will engage the inner surface of the tube 11 and may be slightly flattened, as illustrated in FIG. 2, but holding action is adequate.

DESCRIPTION OF A MODIFICATION

FIG. 3 illustrates a different embodiment of the invention. This is substantially similar to the embodiment of FIGS. 1 and 2 except that cap 12' is formed with a flat inner surface 15' thus eliminating the need for the washer 14 of the other embodiment. When nut 32 is loose, the foot members 22 are free to slide on surface 15' to permit precision alignment of cap 12' on the tube 11.

It will be obvious to one skilled in the art that various changes may be made in the described embodiment of the invention without departing from the spirit and scope thereof and therefore the invention is not limited by that which is illustrated in the drawing and described in the specification, but only as indicated in the accompanying claims.

I claim:

1. Apparatus for mounting a closure cap on the end of a tubular member and in generally coextensive alignment therewith comprising an anchor member having a relatively thick base portion, a pair of relatively thin bowed wing portions extending outwardly from opposite sides of said base portion, an enlarged foot member fixed to the outer end of each wing portion, a generally flat surface located between said cap and said anchor member and adapted to be slidably engaged by the ends of said foot members remote from said wing portions, said anchor member being of a length and width so that portions of said foot members are located within said tubular member and in proximity to the inner periphery thereof, flange means connected to said base portion and extending outwardly therefrom in a direction opposite said foot members, adjustable fastening means extending through said cap and said anchor member and threadedly engaging nut means exteriorly of said base portion, said flange means adapted to prevent rotation of said nut means when said fastening means is rotated, whereby rotation of said fastening means will draw the base portion of said anchor member toward said cap and cause said foot members to spread outwardly into engagement with the inner periphery of said tubular member.

2. The structure of claim 1 in which said flat surface is a washer located between said cap and said anchor member.

3. The structure of claim 1 in which said flat surface is part of said cap.

4. The structure of claim 1 in which said foot members include serrated grooves along the outer sides thereof.